US010100234B2

(12) United States Patent
Kim et al.

(10) Patent No.: US 10,100,234 B2
(45) Date of Patent: Oct. 16, 2018

(54) PRESSURE-SENSITIVE ADHESIVE COMPOSITION, PROTECTIVE FILM, POLARIZER AND LIQUID CRYSTAL DISPLAY COMPRISING THE SAME

(75) Inventors: No Ma Kim, Daejeon (KR); Jae Gwan Lee, Daejeon (KR); An Na Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/812,593

(22) PCT Filed: Jan. 13, 2009

(86) PCT No.: PCT/KR2009/000178
§ 371 (c)(1),
(2), (4) Date: Oct. 7, 2010

(87) PCT Pub. No.: WO2009/091171
PCT Pub. Date: Jul. 23, 2009

(65) Prior Publication Data
US 2011/0187970 A1    Aug. 4, 2011

(30) Foreign Application Priority Data
Jan. 14, 2008  (KR) .................. 10-2008-0004029

(51) Int. Cl.
| | | |
|---|---|---|
| *G02F 1/1335* | (2006.01) | |
| *C09J 133/14* | (2006.01) | |
| *C08F 220/18* | (2006.01) | |
| *C09D 133/06* | (2006.01) | |
| *C09J 133/00* | (2006.01) | |
| *G02B 5/30* | (2006.01) | |
| *C08F 220/28* | (2006.01) | |
| *C08K 5/00* | (2006.01) | |
| *C08K 5/43* | (2006.01) | |

(52) U.S. Cl.
CPC ........... *C09J 133/14* (2013.01); *C08F 220/18* (2013.01); *C09D 133/06* (2013.01); *C09J 133/00* (2013.01); *B32B 2457/202* (2013.01); *C08F 2220/1825* (2013.01); *C08F 2220/1883* (2013.01); *C08F 2220/281* (2013.01); *C08F 2220/286* (2013.01); *C08K 5/0025* (2013.01); *C08K 5/43* (2013.01); *C09J 2201/606* (2013.01); *G02B 5/30* (2013.01); *G02F 2202/28* (2013.01); *Y10T 428/105* (2015.01); *Y10T 428/1059* (2015.01); *Y10T 428/1077* (2015.01); *Y10T 428/1082* (2015.01); *Y10T 428/2848* (2015.01); *Y10T 428/2857* (2015.01)

(58) Field of Classification Search
CPC ........ C09J 2433/00; C09J 7/00; C09J 133/00; C09J 133/08; C09J 133/10; C09J 133/12; C09J 201/00; C09J 201/02; C09J 201/10; C09J 2201/00; C09J 2201/02; C09J 2203/326; C09J 1/133345; C09J 2001/1536; C09J 133/14; C09J 2201/606; G02F 2202/28; B32B 17/10743; B32B 27/00; B32B 27/04; B32B 27/06; B32B 27/08; B32B 27/16; B32B 7/12; B32B 2457/202; C08F 220/18; C08F 2220/1883; C08F 2220/281; C08F 2220/1825; C08F 2220/286; C08K 5/0025; C08K 5/43; C09D 133/06; G02B 5/30; Y10T 428/105; Y10T 428/1059; Y10T 428/1077; Y10T 428/1082; Y10T 428/2848; Y10T 428/2857

USPC .................... 349/96; 424/448; 428/1.1, 354; 524/154

See application file for complete search history.

(56) References Cited

U.S. PATENT DOCUMENTS

| | | | |
|---|---|---|---|
| 4,871,812 A | 10/1989 | Lucast et al. | |
| 5,853,750 A * | 12/1998 | Dietz et al. | .................. 424/448 |
| 2003/0100670 A1* | 5/2003 | Chen et al. | .................. 524/601 |
| 2004/0010088 A1* | 1/2004 | Husemann | ............ C08F 265/04 |
| | | | 525/242 |
| 2005/0142318 A1* | 6/2005 | Nakabayashi et al. | ...... 428/40.1 |
| 2005/0244633 A1* | 11/2005 | Kobayashi et al. | ...... 428/355 R |
| 2006/0024494 A1* | 2/2006 | Amano et al. | ................ 428/343 |
| 2006/0057366 A1* | 3/2006 | Husemann | ............. C09J 133/06 |
| | | | 428/343 |
| 2006/0279923 A1* | 12/2006 | Kim et al. | ..................... 361/683 |
| 2007/0087133 A1* | 4/2007 | Cho et al. | ..................... 428/1.1 |
| 2007/0092733 A1 | 4/2007 | Yang et al. | |
| 2008/0145572 A1* | 6/2008 | Yano | ..................... C09J 7/0217 |
| | | | 428/1.54 |
| 2008/0311395 A1* | 12/2008 | Ukei et al. | ..................... 428/354 |
| 2010/0188620 A1* | 7/2010 | Kim et al. | ..................... 349/96 |

FOREIGN PATENT DOCUMENTS

| | | | | |
|---|---|---|---|---|
| JP | 08-143842 | 6/1996 | | |
| JP | 186658 | 9/1996 | | |
| JP | 08-269431 | 10/1996 | | |
| JP | 2001-323239 | 11/2001 | | |
| JP | 2001323239 A * | 11/2001 | ............ | C09J 133/08 |
| JP | 2005-206776 | 8/2005 | | |
| JP | 2006-111846 | 4/2006 | | |
| JP | WO 2007/029644 A1 * | 3/2007 | .................... | 428/354 |
| JP | 2007-092056 | 4/2007 | | |
| JP | 2007-092056 A | 4/2007 | | |
| JP | 2001-323238 | 11/2011 | | |
| JP | 2011-323239 | 11/2011 | | |
| WO | WO 91/02759 A1 | 3/1991 | | |
| WO | WO 2006091088 A1 * | 8/2006 | ............ | C09J 133/14 |

\* cited by examiner

*Primary Examiner* — Eli D. Strah
(74) *Attorney, Agent, or Firm* — Dentons US LLP

(57) ABSTRACT

The present invention relates to an acrylic pressure-sensitive adhesive composition, and more particularly, to an acrylic pressure-sensitive adhesive composition capable of showing an excellent anti-static performance, and solving a transferring problem of additives and a problem concerning a balance of low-rate and high-rate peel strength, by comprising a) an acrylic copolymer including a monomer having a functional group capable of chelating with a metal salt, and a hydrophobic monomer and b) a metal salt.

11 Claims, No Drawings

PRESSURE-SENSITIVE ADHESIVE COMPOSITION, PROTECTIVE FILM, POLARIZER AND LIQUID CRYSTAL DISPLAY COMPRISING THE SAME

This application is a 35 U.S.C. § 371 National Stage entry of International Application No. PCT/KR2009/000178 filed Jan. 13, 2009, which claims priority to Korean Application No. 10-2008-0004029 filed Jan. 14, 2008 all of which are hereby incorporated by reference for all purposes as if fully set forth herein in their entireties.

TECHNICAL FIELD

The present invention relates to an acrylic pressure-sensitive adhesive composition, and more particularly, to an acrylic pressure-sensitive adhesive composition capable of showing an excellent anti-static performance, and solving a transferring problem of additives and a problem concerning a balance of low-rate and high-rate peel strength, by comprising a) an acrylic copolymer including a monomer having a functional group capable of chelating with a metal salt, and a hydrophobic monomer and b) a metal salt.

BACKGROUND ART

Generally, a protective film is used for protecting the surface of metal products or plastic sheets. As an adhesive for the protective film, an acrylic adhesive has been widely used due to its weather-resistance and transparency. Also as the acrylic adhesive, an adhesive, in which a copolymer comprising an alkyl (meth)acrylate and a crosslinkable monomer is crosslinked with polyisocyanate compound, melamine compound or epoxy compound, has been mainly used.

Concerning adherents of the surface protective film such as polarizers, plastic sheets, electronic appliances, vehicles, and the like, it is very important to protect the adherents from static electricity as well as inflow of foreign material such as dust. Therefore, an anti-static property, together with a adhesive force, is very important in the surface protective film.

In general, static electricity means frictional electrification generated by rubbing two objects or peeling electrification generated by separating two adhered objects. Such static electricity may cause suction of foreign substances such as dust, electrostatic destruction of a device, malfunction of a instrument, fire, and so forth. In particular, the demand of liquid crystal displays (LCDs) has been remarkably increased due to wide spread of computers, expansion of liquid crystal TVs or multi-functional mobile phones, etc. As each assembly device is integrated, and becomes vulnerable to static electricity, it is more important to inhibit generation of static electricity. Also, as the size of the LCDs increases, the size of a polarizer used in manufacturing of the LCD device also increases. Moreover, with the speed-up of processing, static electricity is excessively generated during peeling of a protective film adhered to the polarizer, and then affecting the orientation of liquid crystal in the LCD device and thus causing image detect.

To prevent generation of static electricity, a method of forming an anti-static layer on an outer surface of a polarizer or a protective film substrate layer was proposed, but the effect was not good enough and could not prevent generation of static electricity fundamentally.

Therefore, the anti-static property is needed for the adhesive itself to prevent generation of static electricity. Conventional methods for providing the anti-static property of an adhesive include a method of adding a substance having a conductive component such as a conductive metal powder or a carbon particle to resin and a method of adding a surfactant-type ionic or nonionic substance. However, when the anti-static property is implemented using the additives, a large amount of additives has to be added and thus the additive is migrated to the surface of the pressure-sensitive adhesive, and then degrading a pressure-sensitive adhesive property.

Japanese Patent Laid-Open Publication No. 1993-140519 discloses a method for suppressing static electricity through an addition of ethylene oxide-modified phthalic acid dioctyl plasticizer. However, this method has disadvantages that the plasticizer is migrated to the surface of a polarizer.

Korean Laid-Open Patent Publication No. 2004-30919 discloses a method for suppressing static electricity by adding an organic salt, but this method needs a large amount of expensive organic salt. Korean Laid-Open Patent Publication No. 2006-128659 discloses a method using a chelating agent capable of forming a bond with a metal salt, and alkali metal salt. However, this method is also disadvantageous in that low-rate peel strength is reduced due to a large amount of additives.

DISCLOSURE OF INVENTION

Technical Problem

To solve the foregoing problems of the prior art, an object of the present invention is to provide a pressure-sensitive adhesive composition capable of maintaining an excellent workability and durability superior anti-static property. Another object of the present invention is to provide a protective film, a polarizer and a liquid crystal display comprising the adhesive composition.

Technical Solution

In order to achieve the foregoing objects, the present invention provides an pressure-sensitive adhesive composition comprising a) an acrylic copolymer including a monomer having a functional group capable of chelating with a metal salt and a hydrophobic monomer and b) a metal salt.

The present invention also provides a protective film including a substrate and a pressure-sensitive adhesive layer that is formed on one or both sides of the substrate, and contains the acrylic pressure-sensitive adhesive composition according to the present invention.

The present invention also provides a polarizer comprising a polarizing film or a polarizing device; and a pressure-sensitive adhesive layer that is formed on one or both sides of the film or device, and contains the pressure-sensitive adhesive composition according to the present invention.

The present invention also provides a liquid crystal display comprising a liquid crystal panel in which a polarizer bonded to the protective film according to present invention is attached one or both sides of a liquid crystal cell.

Advantageous Effects

The pressure-sensitive adhesive composition of the present invention is capable of showing an excellent anti-static property, with maintaining a good workability and durability adding a separate chelating agent.

Also, when it is used in a surface protective film for a polarizer, the pressure-sensitive adhesive composition can effectively prevent generation of static electricity after durability evaluation, and exhibits superior balance of low-rate peel strength and high-rate peel strength.

BEST MODE FOR CARRYING OUT THE INVENTION

The present invention relates to a pressure-sensitive adhesive composition comprising a) an acrylic copolymer including a monomer having a functional group capable of chelating with a metal salt and a hydrophobic monomer; and b) a metal salt.

Hereinafter, the present invention will be described in detail.

a) Acrylic Copolymer

An acrylic copolymer used in the present invention is not specially limited, as long as it can be used as an adhesive in the art. For instance, the acrylic copolymer may comprise i) 0.8-5 parts by weight of a (meth)acrylic acid ester monomer having an alkylene oxide group; and ii) 3-18 parts by weight of a hydrophobic monomer.

The (meth)acrylic acid ester monomer having an alkylene oxide group is capable of chelating with a metal salt. In the present invention, the specific kinds of the (meth)acrylic acid ester monomer is not specially limited. For example, the (meth)acrylic acid ester monomer may be a compound represented by the following formula 1:

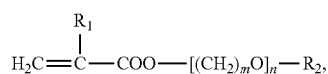

[formula 1]

wherein $R_1$ represent a hydrogen or an alkyl group having 1 to 4 carbon atom(s), m is an integer of 1 to 4, n is an integer of 1 to 10, and $R_2$ represents an alkyl group having 1 to 6 carbon atom(s) or an aryl group having 5 to 12 carbon atoms.

As the compound represented by the above Formula 1, it is preferable to use one or more selected from the group consisting of alkoxy dialkyleneglycol (meth)acrylic acid ester, alkoxy trialkyleneglycol (meth)acrylic acid ester, alkoxy polyalkyleneglycol (meth)acrylic acid ester, phenoxy dialkyleneglycol (meth)acrylic acid ester, phenoxy trialkyleneglycol (meth)acrylic acid ester and phenoxy polyalkyleneglycol (meth)acrylic acid ester. In the above, the alkoxy may be an alkoxy having 1 to 6 carbon atom(s), and more concretely, it may be methoxy, ethoxy or butoxy. Also, the alkyleneglycol may be an alkyleneglycol having 1 to 4 carbon atom(s), and more concretely, it may be ethylene glycol or propylene glycol.

The acrylic copolymer may comprise the monomer having a functional group capable of chelating with a metal salt in an amount of 0.8 to 5 parts by weight, and preferably 1 to 5 parts by weight, and more preferably 2 to 4 parts by weight, based on 100 parts by weight of the copolymer. When the content of the monomer is less than 0.8 parts by weight, it is apprehended that a stable anti-static property is difficult to be realized, whereas when the content is more than 5 parts by weight, it is apprehended that the peel strength after durability evaluation significantly increases with time.

The hydrophobic monomer of the above ii) is not specially limited. For instance, a (meth)acrylic acid ester monomer having an alkyl group of at least 10 carbon atoms, and more preferably a (meth)acrylic acid ester monomer having alkyl group of 10 to 15 carbon atoms can be used. As the hydrophobic monomer, it is preferable to use one selected from or a mixture of two or more selected from the group consisting of isobornyl (meth)acrylate, lauryl (meth)acrylate, tridecyl (meth)acrylate, (meth)acryl acid, and the like.

The acrylic copolymer may comprise the hydrophobic monomer in an amount of 1 to 18 parts by weight, and preferably 2 to 10 parts by weight, and more preferably 3 to 8 parts by weight, relative to 100 parts by weight of the copolymer. When the content of the monomer is less than 1 parts by weight, it is apprehended that a durability of the adhesive is deteriorated, whereas when the content is more than 18 parts by weight, it is apprehended that the low-rate peel strength and/or high-rate peel strength is deteriorated, or wettability is decreased.

In one embodiment of the present invention, the acrylic copolymer may further comprises:

iii) 80 to 95 parts by weight of alkyl (meth)acrylate having an alkyl group of 1 to 9 carbon atom(s); and iv) 0.1 to 10 parts by weight of a monomer containing a crosslinkable functional group.

An examples of iii) the alkyl (meth)acrylate having an alkyl group of 1 to 9 carbon atom(s), it is preferable to use one selected from or a mixture of two or more selected from a group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, n-octyl (meth)acrylate, n-octyl (meth)acrylate, 2-ethylhexyl (meth)acrylate, and the like. Preferably, 2-ethylhexyl (meth)acrylate may be used as the alkyl (meth)acrylate, but it is not limited thereto.

The acrylic copolymer may comprise the alkyl (meth)acrylate monomer in an amount of 80 to 95 parts by weight, based on 100 parts by weight of the copolymer. When the content of the monomer is less than 80 parts by weight, it is apprehended that an adhesive property in early stage is decreased, whereas when the content is more than 95 parts by weight, it is apprehended that a durability is decreased.

In the above, the monomer containing a crosslinkable functional group may function as imparting cohesive strength and adhesive strength by reacting with a crosslinking agent.

An example of the monomer containing a crosslinkable functional group comprises a monomer containing hydroxyl group, a monomer containing a carboxy group and/or a monomer containing nitrogen. In the present invention, one or two or more of the foregoing monomers may be used. An example of usable monomers containing a hydroxyl group herein may include, but is not limited to, one or two or more species of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate. An example of usable monomers containing a carboxyl group herein may include, but is not limited to, one or two or more species of (meth)acrylic acid, 2-(meth)acryloyloxy acetic acid, 3-(meth)acryloyloxy propylic acid, 4-(meth)acryloyloxy butylic acid, acrylic acid dimer, itaconic acid, maleic acid and maleic anhydride. An example of usable monomers containing nitrogen herein may include, but is not limited to, one or two or more species of (meth)acrylamide, N-vinyl pyrolidone and N-vinyl caprolactam.

The acrylic copolymer may comprise the monomer containing a crosslinkable functional group in an amount of 0.1 to 10 parts by weight, and preferably 0.5 to 10 parts by weight, relative to 100 parts by weight of the copolymer. When the content of the monomer is less than 0.1 parts by weight, it is apprehended that the cohesive destruction easily occurs under a high temperature and/or high humidity condition, whereas when the content is more than 10 parts by weight, it is apprehended that flowability is decreased.

According to the present invention, in order to control the glass transition temperature of the pressure-sensitive adhesive or impart various functions, a co-monomer having high glass transition temperature may be comprised in the acrylic copolymer as an arbitrary component.

An example of usable co-monomer may include, but it is not limited to, a compound represented by the following Formular 2:

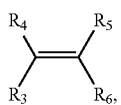

[Formular 2]

wherein, $R_3$, $R_4$ and $R_5$ represents independently hydrogen or alkyl, $R_6$ represents cyano; phenyl unsubstituted or substituted with alkyl; acetyloxy; or $COR_7$, where $R_7$ represents amino unsubstituted or substituted with alkyl or alkoxyalkyl; or glycidyloxy.

In the definitions of R3 to R7 of the above formula 2, alkyl or alkoxy means alkyl or alkoxy having 1 to 8 carbon atoms, and is, preferably, methyl, ethyl, methoxy, ethoxy, propoxy or butoxy.

The specific kind of monomer represented by the above Formula 1 may include, but is not limited to, one or two or more of nitrogen-containing monomers such as (meth)acrylonitrile, (meth)acrylamide, N-methyl (meth)acrylamide or N-butoxy methyl (meth)acrylamide; styrene monomer such as styrene or methyl styrene; glycidyl (meth)acrylate; or carbonic acid vinyl ester such as vinyl acetate, and the like. When the co-monomer as above is contained in the present acrylic copolymer, the content is, preferably, 20 parts by weight or less, based on 100 parts by weight of the acrylic copolymer. If said content is in excess of 20 parts by weight, it is apprehended that flexibility and/or peel force of the pressure-sensitive adhesive is lowered.

The method for preparing the acrylic copolymer is not particularly restricted. For example, it can be prepared through general methods such as solution polymerization, photo-polymerization, bulk polymerization, suspension polymerization, or emulsion polymerization. Especially, it is preferred to use solution polymerization. Preferably, such solution polymerization is carried out at a polymerization temperature of 50 to 140° C. by mixing an initiator in a state that each monomer is homogeneously mixed. At this time, as a usable initiator, a usual initiator, for example, an azo-based polymerization initiator such as azo-bisisobutyronitrile or azobiscyclohexanecarbonitrile; and/or a peroxide such as benzoyl peroxide or acetyl peroxide may be included.

In the present invention, the weight-average molecular weight of the acrylic copolymer may be controlled considering the heat-resistance, peel strength and/or coating efficiency and it is not specially limited. For example, the weight-average molecular weight of the copolymer may be 200,000 to 1,000,000, and preferably is 300,000 to 850,000.

b) Metal Salt

In the present invention, the metal salt may comprise a metal cation and/or anion that can be chelated with the monomer having a functional group capable of chelating. The metal salt is preferably a compound in which a metal ion can be easily dissociated from the salt when the compound is mixed with a solvent or the copolymer having a functional group capable of chelating. Also, it is preferable that the metal ion has small ionic radius and low dissociation energy.

The metal salt can be comprised in an amount of 0.001 to 10 parts by weight, relative to 100 parts by weight of the acrylic copolymer. When the content of metal salt is less than 0.001 parts by weight, it is apprehended that the anti-static performance is degraded, whereas when the content is more than 10 parts by weight, it is apprehended that the endurance reliability may decrease due to low cohesive strength.

The usable metal salt herein may comprises, but is not limited to, one or more metal cation selected from the group consisting of lithium, sodium, potassium, magnesium, calcium, barium and cesium; and one or more anion selected from the group consisting of $Cl^-$, $Br^-$, $I^-$, $BF_4^-$, $PF_6^-$, $AsF^-$, $ClO_4^-$, $NO_2^-$, $CO_3^-$, $N(CF_3SO_2^-)_2^-$, $N(CF_3CO)_2^-$, $N(C_2F_5SO_2)_2^-$, $N(C_2F_5CO)_2^-$, $N(C_4F_9SO_2)_2^-$, $C(CF_3SO_2)_3^-$ and $CF_3SO_3^-$.

c) Crosslinking Agent

The acrylic pressure-sensitive adhesive composition according to the present invention, if necessary, may additionally comprise a multi-functional crosslinking agent. The multi-functional crosslinking agent has a function of increasing cohesion of the adhesive by reacting with the crosslinkable functional group contained in the acrylic copolymer.

Specific kind of the cross-linking agent which may be used herein is not particularly restricted, and may include conventional ones such as an isocyanate compound, an epoxy compound, an aziridine compound and a metal chelate compound.

An example of the isocyanate compound includes tolylene diisocyanate, xylene diisocyanate, diphenylmethane diisocyanate, hexamethylene diisocyanate, isophorone diisocyanate, tetramethylxylene diisocyanate, naphthalene diisocyanate and a reaction product of any one of the foregoing with polyol (ex. trimethylol propane); an example of the epoxy compound includes ethyleneglycol diglycidylether, triglycidylether, trimethylolpropane triglycidylether, N,N,N'N'-tetraglycidyl ethylenediamine and glycerin diglycidylether; an example of the aziridine compound include N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinylphosphine oxide. Also, an example of the metal chelate compound includes compound in which multivalent metal such as aluminum, iron, zinc, tin, titan, antimony, magnesium and/or vanadium is being chelated to acetyl acetone or ethyl acetoacetate. In the present invention, one or two or more of the forgoing may be used alone or in a mixture thereof.

The content of multi-functional crosslinking agent is preferably 0.1-10 parts by weight, relative to 100 parts by weight of the acrylic copolymer. When the content is controlled in the above range, the cohesive strength of the pressure-sensitive adhesive is superior, a problem in pressure-sensitive adhesion durability such as bubbles or exfoliation does not occur, and lifting does not occur, thereby providing superior endurance reliability.

d) Additive

The acrylic pressure-sensitive adhesive composition according to the present invention, if necessary, may additionally comprise a silane coupling agent and/or tackifier.

The silane coupling agent has a function of improving adhesion stability and thus improving heat resistance/moisture resistance when the acrylic pressure-sensitive adhesive is adhered to a glass substrate. In particular, the silane coupling agent serves to be of help to enhances adhesion reliability when it is left for a long time under high temperature and high humidity.

The silane coupling agent may use one selected from or a mixture of at least two selected from a group consisting of γ-glycycloxypropyl trimethoxysilane, γ-glycycloxypropyl methyldiethoxysilane, γ-glycycloxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, γ-acetoacetatepropyl trimethoxysilane, and the like.

The content of silane coupling agent is preferably 0.005 5 parts by weight, relative to 100 parts by weight of the acrylic copolymer. When the content is controlled in the above range, adhesion stability and adhesion reliability are enhanced under high temperature and high humidity.

The tackifier resin has a function of controlling the adhesive performance of the acrylic pressure-sensitive adhesive.

The tackifier resin may use one selected from or a mixture of at least two selected from a group consisting of (hydrogenated) hydrocarbon resin, (hydrogenated) rosin resin, (hydrogenated) rosin ester resin, (hydrogenated) terpene resin, (hydrogenated) terpene penol resin, polymerized rosin resin, polymerized rosin ester resin, and the like.

The content of tackifier resin is preferably 1 to 100 parts by weight, relative to 100 parts by weight of the acrylic copolymer. When the content is in that range, the compatibility and cohesive strength of the pressure-sensitive adhesive can be enhanced.

The acrylic pressure-sensitive adhesive composition according to the present invention, if necessary, may additionally comprise an additive such as acrylic low-molecular-weight substances, epoxy resin, curing agents, UV stabilizers, antioxidants, coloring agents, reinforcing agents, fillers, antifoaming agents, surfactants, plasticizer, or organic salts.

The acrylic pressure-sensitive adhesive composition according to the present invention can be widely used without limitation, such as for industrial sheets, particularly protective films, reflective sheets, structural pressure-sensitive adhesive sheets, photographic pressure-sensitive adhesive sheets, lane marking pressure-sensitive adhesive sheets, optical pressure-sensitive adhesive products, or pressure-sensitive adhesives for electronic components. The pressure-sensitive adhesive composition can also be applied to equivalent fields using same principles such as multi-layer laminate products, i.e., general industrial pressure-sensitive adhesive sheet products, medical patches, heat activated pressure sensitive adhesives, or the like.

The present invention also provides a protective film including:
a substrate; and
a pressure-sensitive adhesive layer that is formed on one or both sides of the substrate, and contains the pressure-sensitive adhesive composition according to the present invention.

The protective film can be effectively used for protecting an optical film, preferably the surface of a polarizer.

The substrate film, which is not particularly limited, may be a cellulose film, polyester film such as polycarbonate, or polyethylene terephthalate; a poly ether film such as polyether sulphone; or a polyolefine film such as polyethylene film, polypropylene film, polyolefin film having cyclo or norbornene structure, or ethylene-propylene copolymer.

The substrate may have a single layer or two or more laminated layers, and its thickness may be properly selected depending on its application, but is preferably 5 μm to 500 μm, and more preferably 15 μm to 100 μm.

Also, the substrate film may be treated with surface-treatment or primer-treatment on one side or both sides to enhance the adherent property between the substrate and the pressure-sensitive adhesive, and may further include an anti-static layer or an anti-fouling layer.

A method of forming the pressure-sensitive adhesive layer on the substrate as above is not particularly restricted, and, for example a method in which the composition or coating liquid is coated and hardened on said substrate with Bar Coater and the like, or a method in which the composition or coating liquid is coated and dried on the surface of releasable substrate and then, the prepared adhesive layer is transferred to the surface of the substrate.

At this time, the thickness of the adhesive layer may be 2 μm to 100 μm, and preferably 5 μm to 50 μm.

In the protective film of the present invention, the gel content (crosslinking density) as represented in General Formula 1 below is preferably 50% to 95%.

$$\text{Gel Content (\%)} = B/A \times 100 \qquad \text{[General Formula 1]}$$

wherein, A represents weight of a pressure-sensitive adhesive composition, and B represents dry weight of insoluble content after depositing the pressure-sensitive adhesive composition in ethyl acetate at ambient temperature for 48 hours.

If said gel content is less than 50%, or in excess of 95%, it is apprehended that the endurance reliability under high temperature and/or high humidity conditions is lowered.

The present invention also provides a polarizer including:
a polarizing film or a polarizing device; and
a pressure-sensitive adhesive layer that is formed on one or both side of the polarizing film or polarizing device, and contains the acrylic pressure-sensitive adhesive composition according to the present invention.

Specific kind of a polarizing film or polarizing device constituting said polarizer of the present invention is not particularly restricted. For example, a film obtained by containing a polarizing component such as iodine or dichroic dye into polyvinyl alcohol resin film, and elongating the resulting product may be used as said polarizing film. Said polyvinyl alcohol resin may comprise polyvinyl alcohol, polyvinyl formal, polyvinyl acetal and hydrolysate of ethylene-vinyl acetate copolymer, and the like. The thickness of said polarizing film is also not particularly restricted. It may be formed in a usual thickness.

The polarizer may be formed as a multilayer film, wherein protective films, such as a cellulose film, for example, triacetyl cellulose; a polyester film, for example a polycarbonate film or a polyethylene terephthalate; a polyether sulphone film; and/or a polyolefin film, for example, polyethylene film, polypropylene film, polyolefin film having cyclo or norbornene structure, or ethylene-propylene copolymer, are laminated on one or both sides of the polarizing film or device. At this time, the thickness of these protective films is also not particularly restricted. It may be formed in a usual thickness.

In addition, the present polarizer may further comprise one or more functional layers selected from the group consisting of protective layer, reflecting layer, anti-glare layer, phase difference plate, compensation film for wide view angle, and brightness enhancing film.

The method of forming the pressure-sensitive adhesive layer on the polarizing film or device as above, a thickness and crosslinking density are not particularly restricted. For example, the same method, thickness or crosslinking density as described in the protective film can be applied.

The present invention further provides a liquid crystal display comprising a liquid crystal panel in which a polarizer bonded to the protective film of the present invention is attached one or both sides of a liquid crystal cell.

Specific kind of liquid crystal cell, constituting the liquid crystal display of the present invention as above, is not particularly restricted, and includes all general liquid crystal cells such as TN (Twisted Neumatic), STN (Super Twisted Neumatic), IPS (In Plane Switching) or VA (Vertical Alignment). Specific kind of other construction included in the liquid crystal display of the present invention and process for preparing the same is not particularly restricted, and general constructions in this field may be selected and used without limitation.

EXAMPLE

While examples of the present invention have been described in detail, it is apparent to those of ordinary skill in the art that various changes and modifications can be made within the technical idea of the present invention and those changes and modifications are included in the appended claims.

Preferred embodiments of the present invention will be provided in the following examples to help understanding of the present invention, but those embodiments are used only for the purpose of illustration, without limiting the scope of the present invention.

Preparation Example 1

To 1 L reactor equipped with a cooling system was added a mixture of monomers consisting of 90 parts by weight of 2-ethylhexyl acrylate (EHA), 5 parts by weight of lauryl acrylate, 2 parts by weight of methoxy triethylene glycol acrylate and 3 parts by weight of 2-hydroxyethylacrylate (HEA). Then, 100 parts by weight of ethyl acetate (EAc) was added thereto as a solvent. To remove oxygen, nitrogen gas was purged for 60 minutes. Then, the temperature was kept at 70° C., and 0.1 parts by weight of azobis(2-methylbutyronitrile)(Wako, V-59) as a initiator was added thereto and reacted for 6 hours. After the reaction, the resulting product was diluted with ethyl acetate (EAc) to prepare an acrylic copolymer having a solid content of 44% by weight, a weight average molecular weight of 580,000, and a molecular weight distribution of 7.0.

Preparation Examples 2 to 7

Except that components and compositions as shown in Table 1 were used, an acrylic copolymer was prepared by the same method as described in Preparation Example 1.

TABLE 1

| | | Preparation Examples | | | | | | |
|---|---|---|---|---|---|---|---|---|
| | | 1 | 2 | 3 | 4 | 5 | 6 | 7 |
| Composition | 2-EHA | 90 | 91 | 92 | 85 | 90 | 96.5 | 95 |
| | MTEGA | 2 | — | 2 | 4 | 2 | 0.5 | 2 |
| | MPEGA | — | 1 | — | — | — | — | — |
| | LA | 5 | 5 | — | 8 | — | — | — |
| | IBA | — | — | 3 | — | 5 | — | — |
| | HEA | 3 | 3 | 3 | 3 | 3 | 3 | 3 |
| | V-59 | 0.1 | 0.1 | 0.1 | 0.1 | 0.1 | 0.1 | 0.1 |
| | EAc | 100 | 100 | 100 | 100 | 100 | 100 | 100 |
| Solid | | 44 | 44 | 44 | 44 | 44 | 44 | 44 |
| $M_w$ (10 thousand) | | 58 | 55 | 50 | 49 | 51 | 53 | 54 |
| Molecular Weight Distribution | | 7.0 | 6.8 | 7.5 | 7.7 | 6.3 | 5.5 | 6.2 |

2-EHA: 2-ethylhexyl acrylate, LA: lauryl acrylate
MTEGA: methoxy triethylene glycol acrylate
MPEGA: methoxy polyethylene glycol acrylate(ethylene glycol repeating unit = 9)
IBA: isobornyl acrylate
HEA: 2-hydroxyethylacrylate
V-59: 2,2'-azobis(2-methylbutyronitrile)
EAc: ethylacetate Mode for the Invention Example 1

The 100 parts by weight of the acrylic copolymer prepared in Preparation Example 1, 5.0 parts by weight of a prepolymer of hexamethylenediisocyanate as a crosslinking agent, and 0.1 parts by weight of lithiumtrifluoromethanesulfoneimid ($LiN(CF_3SO_2)_2$) as a metal salt were added. This mixture was diluted in a proper concentration, homogeneously mixed, coated on one side of a 2-axis polyethyleneterephthalate film having a thickness of 38 μm and dried, thereby preparing a 20 μm homogeneous pressure-sensitive adhesive layer.

Then, a releasing film was laminated on the pressure-sensitive adhesive layer coated on the one side of the polyethyleneterephthalate film and the product was kept for 4 days at a temperature of 23° C. and a humidity of 55% for sufficient aging. The thus prepared protective film was cut into proper sizes, and adhered onto a triacetyl cellulose surface (TAC film, Fusi Film Co. of Japan) and an anti-glare film (AG TAC, DNP Co. of Japan) of the polarizer for evaluation.

Examples 2-5 and Comparative Examples 1 and 2

Except that the acrylic copolymer was mixed using components and compositions as shown in Table 2, the samples was prepared by the same method as described in Example 1.

TABLE 2

| | Examples | | | | | Comparative Examples | |
|---|---|---|---|---|---|---|---|
| | 1 | 2 | 3 | 4 | 5 | 1 | 2 |
| acrylic copolymer | Preparation example 1 | Preparation example 2 | Preparation example 3 | Preparation example 4 | Preparation example 5 | Preparation example 6 | Preparation example 7 |
| Metal salt $LiN(CF_3SO_2)_2$ | 0.1 | 0.1 | 0.1 | 0.1 | 0.1 | 0.1 | 0.1 |
| Crosslinking agent | 5.0 | 5.0 | 5.0 | 5.0 | 5.0 | 5.0 | 5.0 |

$LiN(CF_3SO_2)_2$—lithiumtrifluoromethanesulfoneimid

By using the protective film prepared in Examples 1 to 5, and Comparative Examples 1 and 2, low-rate peel strength, high-rate peel strength, and peeling electrification voltage were measured and the results are illustrated in Table 3. Also, low-rate peel strength, high-rate peel strength, and peeling electrification voltage after heat resistance evaluation were also measured and the results are illustrated in Table 4.

1. Low-Rate and High-Rate Peel Strengths

The adhesive layer prepared in Examples and Comparative Examples was attached onto a triacetyl cellulose surface (TAC film, Fusi Film Co. of Japan) and an anti-glare film (AG TAC, DNP Co. of Japan) by using a roller of 2 kg on the basis of JIS Z 0.27, and was kept at a temperature of 23 C and a relative humidity of 65% for 24 hours. The low-rate and high-rate peel strengths were measured by a tensile strength tester with 180° angle and peel rates of 0.3 m/min (low rate) and 30 m/min (high rate).

2. Peeling Electrification Voltage

The polarizer having attached thereto the protective film prepared in Examples and Comparative Examples was cut into a size of 25 cm×22 cm for a sample, which then was kept at a temperature of 23° C. and a relative humidity of 50% for 24 hours. When the protective film was peeled at a rate of 40 m/min from the polarizer, the static voltage generated on the surface of the polarizer was measured by using a static voltage meter STATRION-M2 at 1 cm above the surface of the polarizer.

3. Durability

The polarizer having attached thereto the protective film prepared in Examples and Comparative Examples was kept in 50° C. oven for 10 days, and then kept at a temperature of 23° C. and a relative humidity of 65% for 24 hours. Then the low-rate/high-rate peel strengths and the peeling electrification voltage were measured again for durability evaluation.

TABLE 3

|  |  | Examples | | | | | Comparative Examples | |
|---|---|---|---|---|---|---|---|---|
|  |  | 1 | 2 | 3 | 4 | 5 | 1 | 2 |
| Low-rate peel strength | TAC | 3.0 | 3.2 | 4.5 | 5.2 | 5 | 3 | 5.4 |
|  | AG | 2.8 | 4 | 5.3 | 6.0 | 5.5 | 3.2 | 7.4 |
| High-rate peel strength | TAC | 100 | 103 | 105 | 115 | 107 | 105 | 105 |
|  | AG | 90 | 85 | 95 | 110 | 100 | 95 | 100 |
| Static voltage (kV) | TAC | 0.2 | 0.15 | 0.1 | 0.3 | 0.1 | 0.2 | 0.2 |
|  | AG | 0.3 | 0.2 | 0.1 | 0.3 | 0.1 | 0.2 | 0.2 |

TABLE 4

|  |  | Examples | | | | | Comparative Examples | |
|---|---|---|---|---|---|---|---|---|
|  |  | 1 | 2 | 3 | 4 | 5 | 1 | 2 |
| Low-rate peel strength | TAC | 3.5 | 4 | 5 | 7 | 5.5 | 5 | 9.2 |
|  | AG | 3.8 | 3.6 | 5.6 | 6.5 | 6 | 6 | 11.4 |
| High-rate peel strength | TAC | 102 | 100 | 103 | 114 | 107 | 120 | 150 |
|  | AG | 88 | 85 | 96 | 105 | 98 | 130 | 176 |
| Static voltage (kV) | TAC | 0.3 | 0.2 | 0.15 | 0.4 | 0.15 | 0.6 | 0.6 |
|  | AG | 0.35 | 0.3 | 0.15 | 0.3 | 0.15 | 0.8 | 2.0 |

As shown in Table 3 and Table 4, Examples 15 according to the present invention maintain stable balance of low-rate peel strength and high-rate peel strength and stable peeling electrification voltage before and after durability evaluation without addition of a chelating agent to the metal salt.

On the contrary, Comparative Example 1 shows high increase in peeling electrification voltage before and after durability evaluation. Comparative Examples 2 shows a problem that low-rate peel strength and high-rate peel strength remarkably increase after durability evaluation.

The invention claimed is:

1. A protective film comprising:
a substrate; and
a pressure sensitive adhesive layer that is formed on one or both sides of the substrate and that comprises a cured product of a pressure sensitive adhesive composition comprising:
a) an acrylic copolymer including 0.8 to 5 parts by weight of a monomer having a functional group capable of chelating with a metal salt; 80 to 95 parts by weight of an alkyl (meth)acrylate having an alkyl group of 1 to 9 carbon atom(s); and 3 to 5 parts by weight of isobornyl (meth)acrylate, and 0.1 to 10 parts by weight of a monomer having a crosslinkable functional group, based on 100 parts by weight of the copolymer; and
b) a metal salt,
wherein the monomer having a functional group capable of chelating with a metal salt is a compound represented by Formula 1:

[Formula 1]

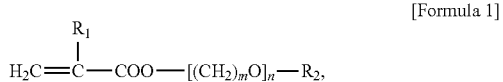

wherein $R_1$ represents a hydrogen or an alkyl group having 1 to 4 carbon atom(s), m is an integer of 1 to 4, n is an integer of 1 to 10, and $R_2$ represents an alkyl group having 1 to 6 carbon atom(s) or an aryl group having 5 to 12 carbon atoms.

2. The protective film of claim 1, wherein the monomer having a functional group capable of chelating with a metal salt is an acrylic monomer having an alkylene oxide group.

3. The protective film of claim 1, wherein the monomer having a functional group capable of chelating with a metal salt is one or more selected from the group consisting of alkoxy dialkyleneglycol (meth)acrylic acid ester, alkoxy trialkyleneglycol (meth)acrylic acid ester, alkoxy polyalkyleneglycol (meth)acrylic acid ester, phenoxy dialkyleneglycol (meth)acrylic acid ester, phenoxy trialkyleneglycol (meth)acrylic acid ester and phenoxy polyalkyleneglycol (meth)acrylic acid ester.

4. The protective film of claim 1, wherein the alkyl (meth)acrylate having an alkyl group of 1 to 9 carbon atom(s) is one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, n-octyl (meth)acrylate and 2-ethylhexyl (meth)acrylate.

5. The protective film of claim 1, wherein the monomer having a crosslinkable functional group is a monomer containing hydroxyl group, a monomer containing carboxy group or a monomer containing nitrogen.

6. The protective film of claim 1, wherein the metal salt comprises one or more metal cation selected from the group consisting of lithium, sodium, potassium, magnesium, calcium, barium and cesium; and one or more anion selected from the group consisting of $Cl^-$, $Br^-$, $BF_4^-$, $PF_6^-$, $AsF^-$, $ClO_4^-$, $NO_2^-$, $CO_3^-$, $N(CF_3SO_2)_2^-$, $N(CF_3CO)_2^-$, $N(C_2F_5SO_2)_2^-$, $N(C_2F_5CO)_2^-$, $N(C_4F_9SO_2)_2^-$, $C(CF_3SO_2)_3^-$ and $CF_3SO_3^-$.

7. The protective film of claim 1, wherein the metal salt is comprised in an amount of 0.001 to 10 parts by weight, relative to 100 parts by weight of the acrylic copolymer.

8. The protective film of claim 1, further comprising 0.1 to 10 parts by weight of a multi-functional crosslinking agent, relative to 100 parts by weight of the acrylic copolymer.

9. The protective film of claim 8, wherein the multi-functional crosslinking agent is one or more selected from the group consisting of isocyanate compound, epoxy compound, aziridine compound and metal chelate compound.

10. A polarizer comprising:
a polarizing film or a polarizing device; and
a pressure-sensitive adhesive layer that is formed on one or both sides of the polarizing film or device, and comprises a cured product of a pressure sensitive adhesive composition, comprising:
a) an acrylic copolymer including 0.8 to 5 parts by weight of a monomer having a functional group capable of chelating with a metal salt; 80 to 95 parts by weight of an alkyl (meth)acrylate having an alkyl group of 1 to 9 carbon atom(s); and 3 to 5 parts by weight of isobornyl (meth)acrylate, and 0.1 to 10 parts by weight of a monomer having a crosslinkable functional group, based on 100 parts by weight of the copolymer; and
b) a metal salt,
wherein the monomer having a functional group capable of chelating with a metal salt is a compound represented by Formula 1:

[Formula 1]

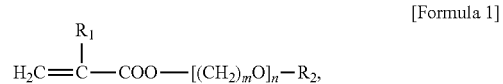

wherein $R_1$ represents a hydrogen or an alkyl group having 1 to 4 carbon atom(s), m is an integer of 1 to 4, n is an integer of 1 to 10, and $R_2$ represents an alkyl group having 1 to 6 carbon atom(s) or an aryl group having 5 to 12 carbon atoms.

11. A liquid crystal display comprising a liquid crystal panel in which a polarizer bonded to the protective film according to claim 1 is attached one or both sides of a liquid crystal cell.

* * * * *